(12) United States Patent
Berdan et al.

(10) Patent No.: US 6,241,227 B1
(45) Date of Patent: Jun. 5, 2001

(54) CUTTING EDGE HANDLER FOR PLOWS AND GRADERS

(75) Inventors: Brian James Berdan, Montgomery; Brian C. Peterson, Fairbault; Walter James Buller, East International Falls, all of MN (US)

(73) Assignee: SPX Corporation, Muskegon, MI (US)

( * ) Notice: Subject to any disclaimer, the term of this patent is extended or adjusted under 35 U.S.C. 154(b) by 0 days.

(21) Appl. No.: 09/248,586

(22) Filed: Feb. 11, 1999

(51) Int. Cl.$^7$ ....................................................... B25B 1/00
(52) U.S. Cl. ......................... 269/17; 269/5 R; 269/10 R; 269/905
(58) Field of Search ................................ 269/17, 900, 901, 269/905, 908, 909; 251/8 R, 9 B, 10 R, 2 B (56) References Cited

U.S. PATENT DOCUMENTS

| | | | |
|---|---|---|---|
| 1,135,765 | * | 4/1915 | Chapman ............................ 254/10 R |
| 3,861,662 | * | 1/1975 | Morse ................................... 269/905 |
| 4,138,099 | * | 2/1979 | Englehart .............................. 269/905 |
| 5,123,803 | * | 6/1992 | Crabtree ................................. 269/17 |
| 5,518,224 | * | 5/1996 | Anderson .............................. 254/131 |
| 5,667,207 | * | 9/1997 | Pistole ................................... 269/17 |
| 5,829,948 | * | 11/1998 | Becklund .............................. 254/8 R |
| 5,863,034 | * | 1/1999 | Vauter ................................... 269/17 |
| 5,979,878 | * | 11/1999 | Blankenship ......................... 254/131 |

FOREIGN PATENT DOCUMENTS

2120748 * 4/1971 (DE) ................................. 254/10 R

OTHER PUBLICATIONS

New–Form Manufacturing Co., LTD. Sales Flyer.

* cited by examiner

*Primary Examiner*—Joseph J. Hall, III
*Assistant Examiner*—Daniel Shanley
(74) *Attorney, Agent, or Firm*—Pepper Hamilton LLP (57) ABSTRACT

A cart is configured to handle replaceable plates used on the blade of a plow or grader. The cart includes a wheeled frame and a plate holder configured to support the plate lengthwise in a generally upright orientation. The plate holder is supported on the frame by a parallelogram linkage that permits adjustment of the plate holder, and thereby the plate carried by the holder, without varying the orientation of these components. An inventive plate installation method is also disclosed. The method involves placing at least one plate on the height-adjustable plate holder carried on the mobile frame. The attachment holes defined in the plate are then aligned with the attachment holes defined in the blade.

20 Claims, 5 Drawing Sheets

CUTTING EDGE HANDLER FOR PLOWS AND GRADERS

RELATED APPLICATIONS

Not Applicable

FEDERALLY SPONSORED RESEARCH OR DEVELOPMENT

Not Applicable

MICROFICHE APPENDIX

Not Applicable

BACKGROUND OF THE INVENTION

1. Field of the Invention

The present invention relates generally to accessories used with plows (e.g., snow plows) and graders. More particularly, the present invention concerns a device for handling replaceable plates, such as cutting edges and wear plates, used on the blades of plows and graders. The present invention also concerns the improved method of installing the replaceable plates.

2. Discussion of Prior Art

The blade of a plow or grader is typically provided with at least one replaceable plate for improving the cutting and/or plowing action of the blade and for increasing the life span of the blade. It is common to utilize a dual plate arrangement, which often includes a cutting edge secured against the lower margin of the front face of the blade and a wear plate secured over the cutting edge. The cutting edge projects downwardly below the lower margin of the blade and is customarily formed of a hard material, such as tungsten carbide. The wear plate is designed to cooperate with the cutting edge in improving blade operation and durability. Particularly, the wear plate and cutting edge are preferably coextensive, with the wear plate being superimposed over the cutting edge. The wear plate is preferably formed of a stronger, more durable material (e.g., standard carbon steel) than the cutting edge. That is to say, the cutting edge is typically formed of a brittle albeit hard material, and the wear plate is consequently designed to absorb the impact loads created as the blade encounters objects, such as rocks or other debris located on a roadway.

It will be appreciated that replacement plates extend across the entire blade and are consequently relatively long, even when divided into several sections arranged end-to-end across the front of the blade. For example, a typical plow blade and the replacement plates used thereon will be approximately twelve feet long (measured from side to side). The plates are consequently unwieldy and heavy. Moreover, replacement of the plates traditionally involves two workers manually holding the plate off of the ground and moving the plate until the attachment holes in the plate align with the corresponding attachment holes defined in the blade, while a third worker inserts bolts through the aligned attachment holes. It will also be appreciated that conventional replacement plates will often weigh in excess of one hundred pounds. Thus, the conventional system for replacing the plates used on the blade of a grader or plow is laborious, difficult and expensive.

OBJECTS AND SUMMARY OF THE INVENTION

Responsive to these and other problems, an important object of the present invention is to provide a system for simplifying and facilitating the replacement of the plates used on the blade of a plow or grader. It is also important object of the present invention to provide a device for assisting the worker with manipulation of the plates during installation and removal. Another important object of the present invention is to make the device inexpensive and simple in construction, yet sufficiently durable to withstand the rigorous operating conditions encountered during blade replacement. Yet another object of the present invention is to provide a system that permits the plates to be replaced by only one worker, without requiring the worker to manually hold the plates off of the ground during replacement.

In accordance with these and other objects evident from the following description of the preferred embodiment, the present invention concerns a device in the form of a cart for handling the replaceable plates used on the blade of a plow or grader. The cart includes a wheeled frame and a plate holder supported on the frame for up and down movement relative to the ground. The plate holder is designed to support the plate in an orientation generally corresponding to the front face of the blade. This typically involves supporting the plate in an upright orientation so that the plate may be placed against the generally upright front face of the blade. In some cases, the plate may be oriented at a slight angle relative to vertical to correspond with the orientation and/or the curvature of the front face of the blade.

The cart preferably includes a parallelogram linkage for supporting the plate holder on the frame, with the linkage maintaining the plate holder, and thereby the plate or plates supported thereon, in a single orientation as the holder is raised and lowered. An actuator may be connected between the frame and linkage for effecting raising and lowering of the plate holder. This is particularly useful when the cart is being used to install large, heavy plates. The cart may also be provided with a tongue that facilitates movement of the cart into the desired locations, especially in low clearance situations. The frame of the cart is preferably supported on caster wheel assemblies, and the tongue may be attached to the frame in several different locations to improve maneuverability of the cart.

The present invention also concerns the improved method of installing the replaceable plates. This method permits just one worker to install the plates, without having to manually hoist the plates during installation. Particularly, the installation method involves the steps of supporting at least one plate on a mobile cart and aligning the attachment holes defined in the at least one plate with the corresponding attachment holes defined in the blade. The plate is preferably supported on a height-adjustable holder carried on the frame so that the height of the plate may be adjusted during the step of aligning the attachment holes. Of course, alignment of the attachment holes may also involve moving the cart into proximity with the blade.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein.

DETAILED DESCRIPTION OF THE PREFERRED EMBODIMENTS

Figure 1:
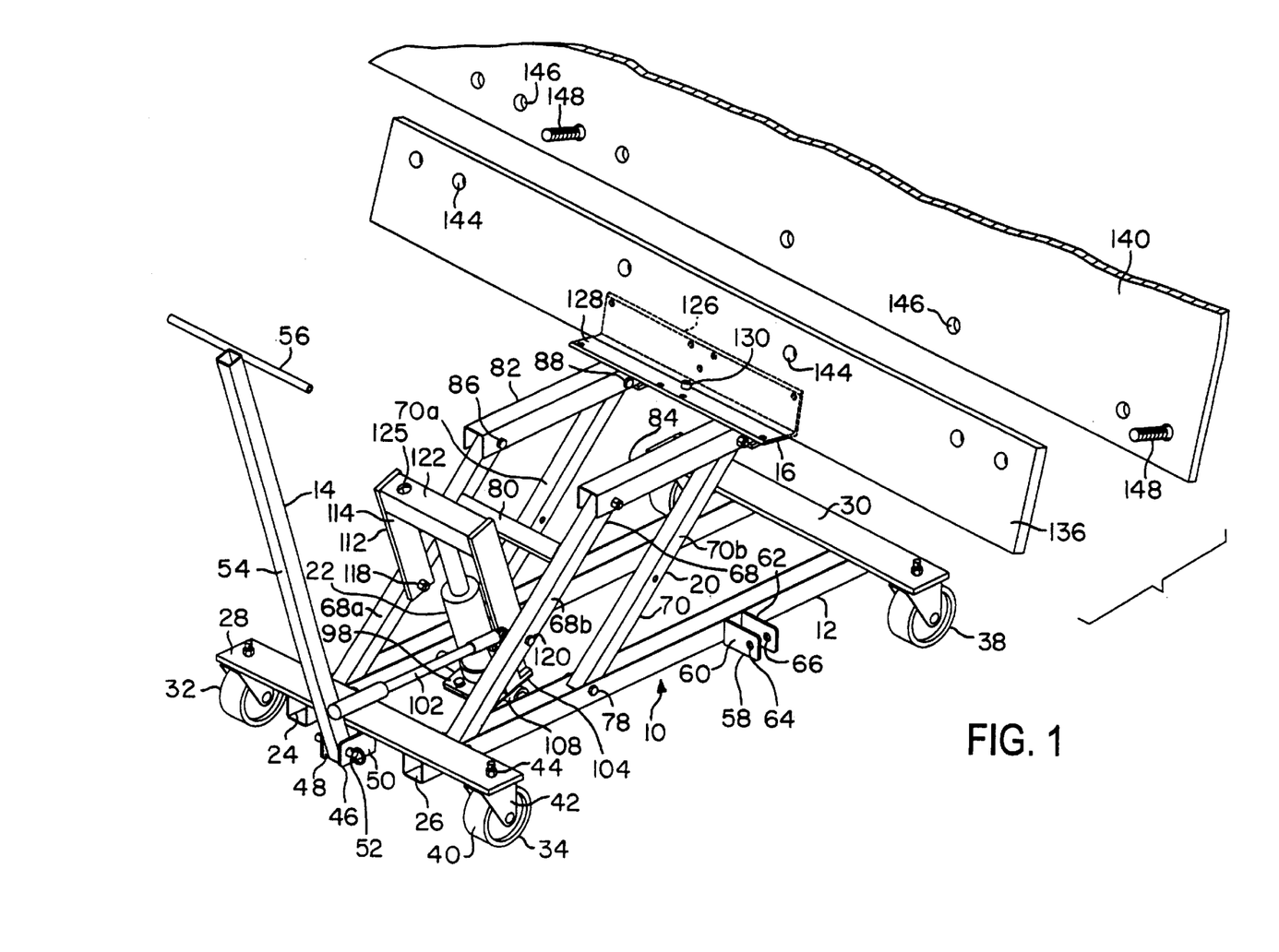
FIG. 1 is a perspective view of a cart constructed in accordance with the principles of the present invention, with the illustrated cart supporting a replaceable plate as it is being installed on the blade of a plow or grader.

Turning first to FIG. 1, the plate handling device 10 selected for illustration comprises a mobile cart designed to assist the operator in installing and removing the replaceable plates used on the blade of a plow or grader. As will subsequently be described, the illustrated cart 10 permits a single user to install a plate, without having to hold the plate off the ground during installation. That is to say, the illustrated cart 10 permits the user to relatively effortlessly manipulate a plate into the proper orientation with respect to the blade. It is particularly noted that the cart 10 generally includes a wheeled frame 12, a tongue 14 projecting from the frame 12, a pair of plate holders 16 and 18, a parallelogram linkage 20 supporting the plate holders 16 and 18 on the frame for relative up and down movement, an actuator 22 coupled between the frame 12 and linkage 20 for controlling the height of the holders 16 and 18, and various other parts associated with these primary components.

The wheeled frame 12 has a relatively low profile (e.g., see FIG. 4) and preferably includes a pair of fore-and-aft extending U-shaped beams 24 and 26 and a pair of flat, transverse cross-plates 28 and 30 (e.g., see FIGS. 1 and 2) interconnecting the beams 24 and 26. It is noted that each of the plates 28 and 30 is fixed to the top of the beams 24 and 26 at a corresponding end thereof. In addition, each of the plates 28 and 30 has sufficient length to project laterally outward of the beams 24 and 26 to present overhanging portions. The illustrated frame 12 further includes four caster wheel assemblies 32, 34, 36, 38 connected to the overhanging portions of the plates 28 and 30. Only the caster wheel assembly 34 will be detailedly described herein, with the understanding that the remaining wheel assemblies are similarly constructed. The assembly 34 includes a wheel 40 rotatably supported between the arms of a yoke 42. The assembly 34 further includes a threaded fastener 44 for attaching the assembly to the corresponding overhanging portion of the cross-plate 28, with a traditional swivel (not shown) being provided between the yoke 42 and fastener 44 for allowing the yoke 42 to rotate about an upright axis generally defined by the fastener 44. Those ordinarily skilled in the art will appreciate that the caster wheel assemblies 32–38 permit the cart 10 to be moved in virtually any direction across the support surface. In addition, it is not necessary that the cart 10 be equipped with four caster wheels assemblies to provide the desired multidirectional movement (e.g., two caster wheel assemblies and two fixed wheel assemblies may be sufficient).

Projecting from one end of the frame 12 is a tongue attachment bracket 46, which includes a pair of spaced apart, rectangular shaped plates 48 and 50 fixed to the underside of the cross-plate 28. The plates 48 and 50 present aligned openings (not visible in the drawing figures) configured to receive a retaining pin 52 therein.

In this respect, the illustrated tongue 14 includes a square-shaped tube 54 having an opening (also not visible in the drawing figures) adjacent one end thereof, with the opening similarly being configured to receive the retaining pin 52 therein. The tube 54 is consequently swingable about a substantially horizontal axis defined by the pin 52. A cylindrical rod 56 is preferably fixed to the distal end of the tube 54 for presenting a handle that may be grasped by the user during manipulation of the cart 10.

A second tongue attachment bracket 58 is provided on the side of the frame 12. The side bracket 58 similarly includes a pair of plates 60 and 62, although the plates 60, 62 are fixed to the outer side of the beam 26. The plates 60 and 62 present aligned openings 64 and 66 configured to receive the retaining pin 52. Accordingly, the tongue 14 may be connected to the frame 12 by either bracket 46 or 58, with movement of the tongue 14 from one bracket to another simply requiring removal of the pin 52, alignment of the openings in the tongue and other bracket, and insertion of the pin 52 into the aligned openings. It is noted that the tongue 14 projects in relatively transverse directions when attached to the brackets 46 and 58.

The frame 12 and tongue 14 are preferably formed of metal, although other suitable materials (e.g., high strength plastic) may be used. In addition, the means by which components of the frame 12 and tongue 14 are fixed to one another may be varied as desired, although suitable welding techniques are preferred.

The parallelogram linkage 20 includes two equal-length bars 68 and 70 (e.g., see FIG. 3), each of which comprises a respective pair of laterally spaced apart links 68a, 68b and 70a, 70b. The links 68a and 70a are pivotally connected to the beam 24 by respective fasteners 72 and 74 (e.g., standard nut and bolt assemblies), and the links 68b and 70b are similarly connected to the beam 26 by fasteners 76 and 78 (e.g., see FIG. 2). The pivot connections for the links 68a, 68b or 70a, 70b of each bar 68 or 70 are aligned. Each of the links 68a, 68b, 70a, 70b is preferably formed of a square-shaped metal tube, although any suitable material may be used. It is noted that the links 68a and 68b are interconnected by a brace 80, with the brace being preferably welded between the links when these components are formed of metal. Although not shown, a similar brace may be fixed between the links 70a and 70b if desired.

A pair of U-shaped connectors 82 and 84 extend between and serve to connect the upper ends of the links 68a, 70a and 68b, 70b, respectively. If desired, the connectors 82 and 84 may be formed of the same material as the beams 24 and 26. Similar to the opposite ends of the links, fasteners 86, 88, 90, 92 (see FIGS. 1 and 3) are provided to pivotally attach the links to corresponding ones of the connectors 82 and 84. In addition, the upper pivot connections for the links 68a, 68b or 70a, 70b of each bar 68 or 70 are aligned. Because of the parallel arrangement of the linkage 20, the upper pivot connections for the links 68a and 70a are spaced apart the same distance as the lower pivot connections, and the same may be said of the pivot connections for the links 68b and 70b. The plate holders 16, 18 are fixed to one end of the connectors 82, 84, whereby the linkage 20 supports the holders 16, 18 on the frame 12 for relative up and down movement.

The linkage 20 is attached to the frame 12 closer to one end of the beams 24, 26 than the other and is generally disposed over the frame 12. Thus, movement of the linkage 20 is generally limited to the area above the frame 12, although the linkage 20 may be folded down to an orientation relatively close to the ground as a result of the low profile of the frame 12 (e.g., see FIG. 4). However, it will be appreciated that the principals of the present invention are equally applicable to various other frame and linkage arrangements. For example, the device may include a relatively taller frame with the parallelogram linkage projecting from one of the ends or sides of the frame to support the plate holder(s) thereon. In any case, it is preferred that the device be configured so that the plate holder(s) be positionable relatively close to the ground.

Movement of the linkage 20, and thereby adjustment of the height of the plate holders 16 and 18, is controlled by the actuator 22. In the illustrated embodiment, the actuator 22 comprises a hand-operated hydraulic piston and cylinder assembly including a cylinder 94 housing the piston (not shown) and a rod 96 telescopically received within the cylinder 94 and attached to the piston. This type of assembly is often referred to as a "bottle jack", although any suitable actuator (e.g., a ratchet-type lift) may be used. In the usual manner, the jack 22 includes a pedestal 98, from which the cylinder 94 projects, and a crank mechanism 100 that controls extension of the rod 96 relative to the cylinder 94. The mechanism 100 also includes a removable arm 102 and a release screw (not shown) that permits retraction of the rod 96 when activated. As is also customary, a screw 103 is threadably connected to the distal end of the rod 96.

Figure 2:
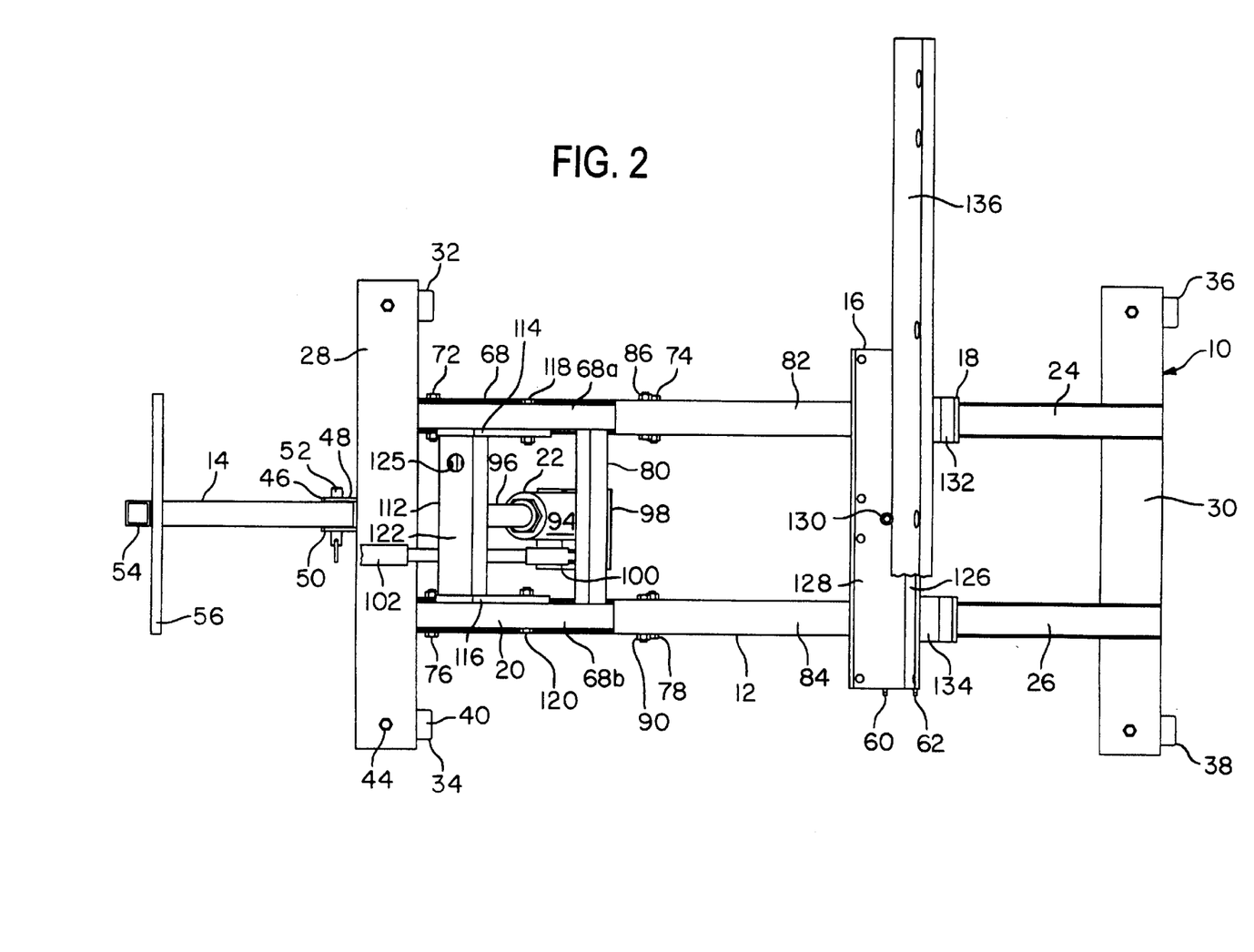
FIG. 2 is an enlarged top plan view of the cart shown in FIG. 1
Figure 3:
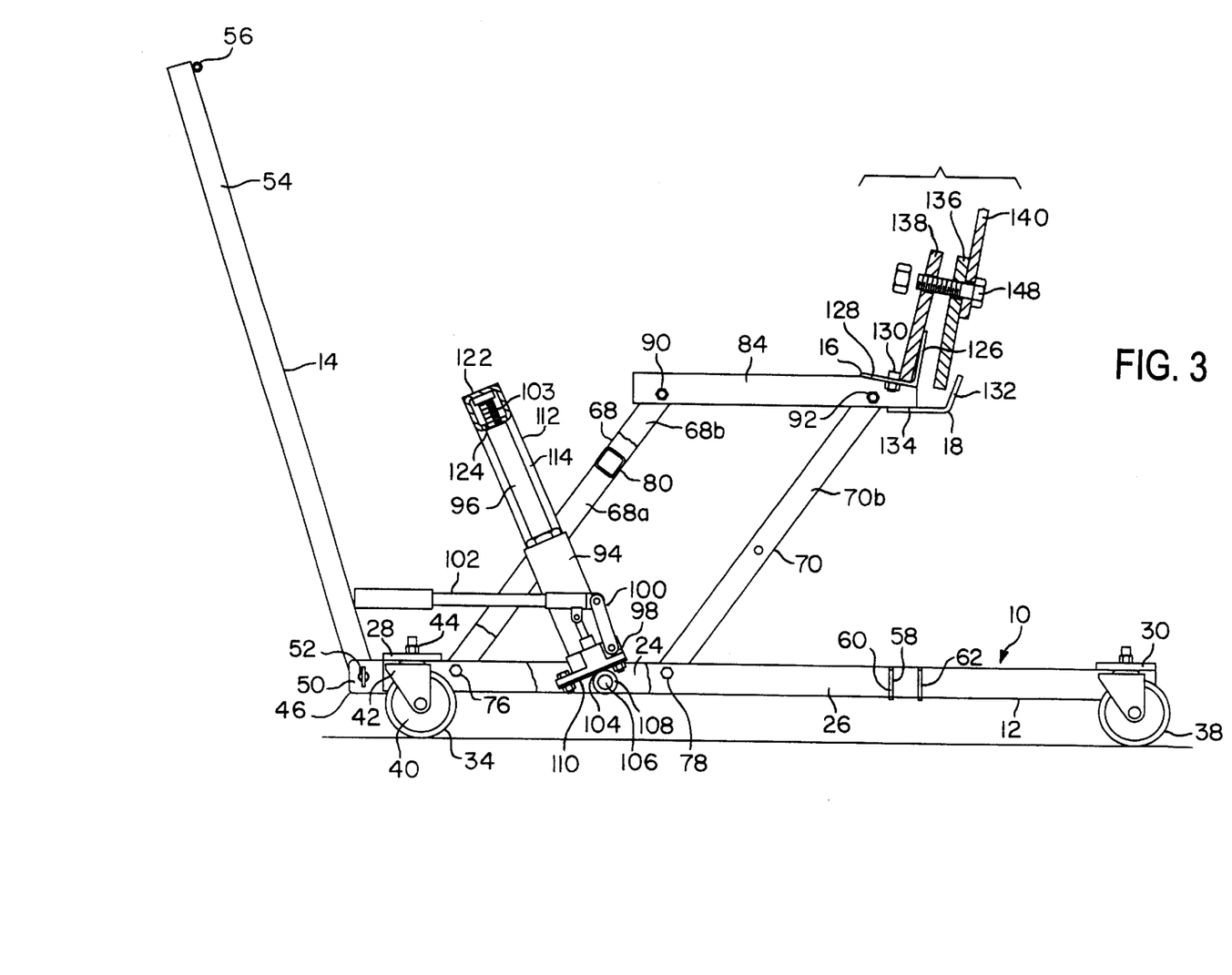
FIG. 3 is an enlarged side elevational view of the cart shown in FIG. 1, with parts being partly broken away to show the constructional details of the actuator, and particularly illustrating the cart being used to install the second replaceable plate (typically referred to as the wear plate) on the front blade of a plow or grader.

The jack 22 is pivotally coupled to the frame 12 by a pivot assembly 104, as perhaps best shown in FIGS. 1 and 3. The assembly 104 includes a cylindrical rod 106 fixed between the beams 24 and 26, a sleeve 108 slidably received on the rod 106, and a mounting plate 110 bolted to the underside of the pedestal 98 and secured to the sleeve 108 in a tangential relationship. The opposite end of the jack 22 is attached to an arm 112 that serves to couple the former with the linkage 20. The illustrated arm 112 includes a pair of side plates 114 and 116 pivotally attached to respective ones of the links 68a and 68b by fasteners 118 and 120 (e.g., see FIGS. 1 and 2). A square-shaped metal tube 122 is preferably welded between the side plates 114 and 116, with the tube 122 presenting an opening 124 (see FIG. 3) configured to receive the screw 103 therein. An opening 125 (see FIGS. 1 and 2) is also defined in the tube 122 for receiving the crank arm 102 therein during periods of non-use (e.g., see FIG. 4).

Figure 4:
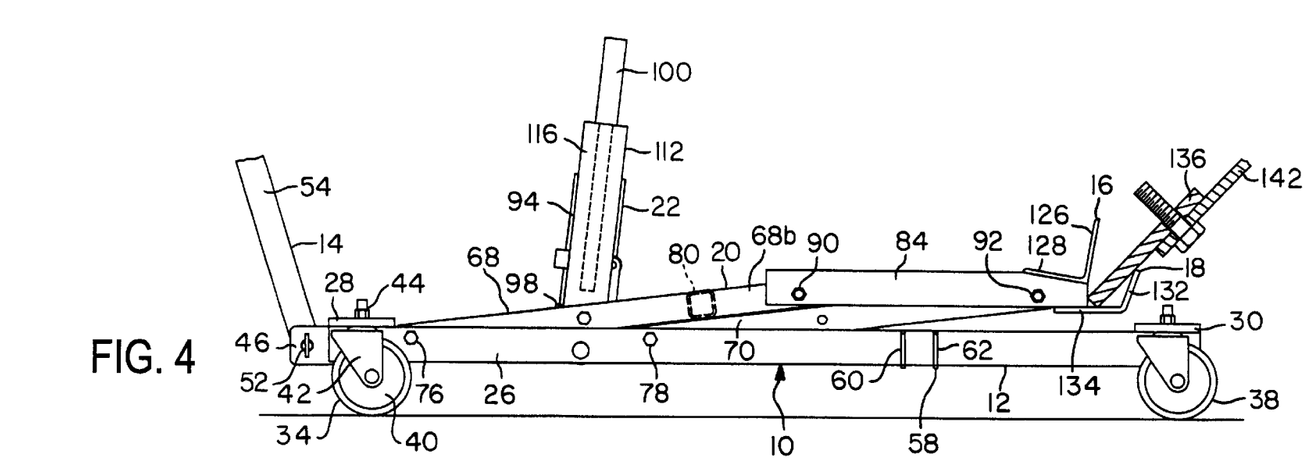
FIG. 4 is an enlarged side elevational view of the cart shown in FIG. 1, particularly illustrating the cart being used to install a replaceable plate on a relatively low blade, such as an underbody plow or grader.

Extension of the rod 96 relative to the cylinder 94 causes the linkage 20 to unfold and thereby raise the plate holders 16 and 18. It is noted that FIG. 3 illustrates the rod 96 in the fully extended condition and the holders 16 and 18 in the fully raised position. On the other hand, when the rod 96 is retracted, the linkage 20 folds and the plate holders 16 and 18 are consequently lowered. The fully lowered positions of the holders 16 and 18 is illustrated in FIG. 4. The parallelogram linkage 20 insures that the orientation of the plate holders 16 and 18 remains substantially constant as it is raised and lowered.

Turning now to the preferred construction of the holders 16 and 18, the plate holder 16 comprises an L-shaped element presenting a generally upright wall 126 and a transverse wall 128. It is noted that the holder 16 is disposed at a slight angle relative to horizontal so that the wall 130 slopes downwardly toward the upright wall 126 (see FIGS. 3 and 4). This is preferably accomplished by tapering the upper edge of the connectors 82 and 84 adjacent the corresponding end (e.g., by grinding, cutting, etc.) and then fixing the wall 128 to the tapered end of the connectors 82 and 84. The plate holder 16 is preferably formed of the same material as the connectors 82 and 84. Particularly, the preferred holder 16 is formed of standard angle iron and is welded to the connectors 82 and 84.

The wall 128 defines an upwardly facing support surface having sufficient length to support the replaceable plates thereon. As will be described further below, the upright wall 126 serves to support the replaceable plates in an upright orientation when they are supported on the wall 128. A nut and bolt assembly 130 is attached to the wall 128 at a location spaced from the upright wall 126 to define a projection that assists with retaining the replaceable plates in the upright orientation. Those ordinarily skilled in the art will appreciate, however, that the projection may be variously constructed (e.g., the projection may be formed by a block welded to the upper surface of the wall 128). It is also noted that the angled orientation of the support 16 further assists with retaining the plates in the upright orientation.

The plate holder 18 similarly comprises a pair of generally L-shaped elements projecting forwardly from the connectors 82 and 84, respectively, and cooperatively presenting a generally upright wall 132 and a bottom support wall 134. It is noted, however, that the walls 132 and 134 of the holder 18 are not transverse relative to one another. Instead, the upright wall 132 is disposed at an obtuse angle (e.g., 120°) relative to the generally horizontal wall 134. One of the replaceable plates may consequently be placed on the support wall 134 and supported in a generally upright orientation by the wall 132. The ends of the connectors 82 and 84 serve to retain the plates supported on the wall 134 in the generally upright orientation. This is facilitated by the angle of the wall 132 relative to the wall 134.

Figure 5:
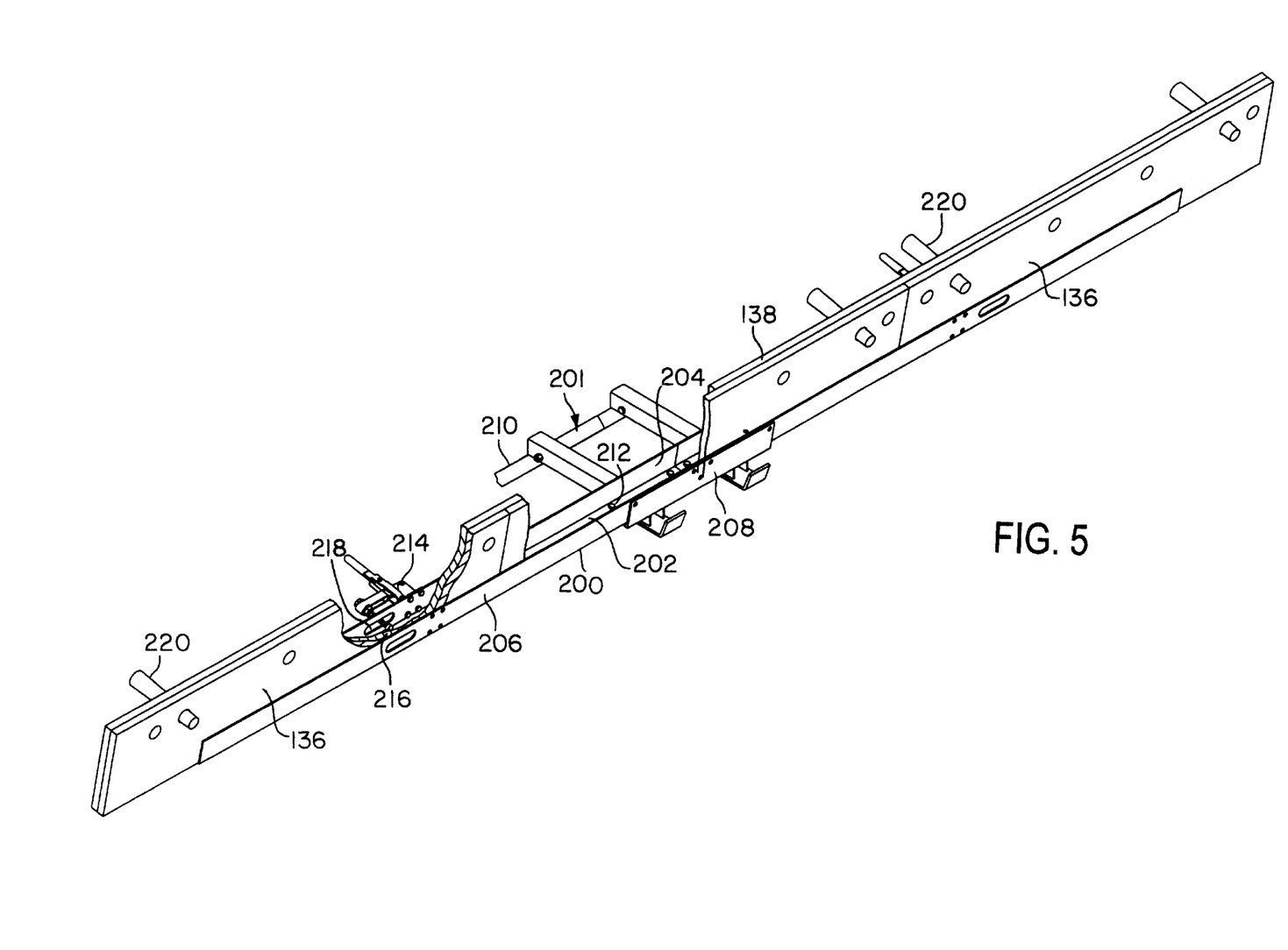
FIG. 5 is a fragmentary perspective view of an alternative embodiment of the present invention, wherein an extension boom having a pair of clamping mechanisms is provided for securely supporting a long plate and/or a plurality of plate sections.

In view of the foregoing, it will be appreciated that the cart 10 may be used to facilitate replacement of virtually any type of plate used on the blade of a plow or grader. In addition, the cart 10 can be used during replacement of plates on various types of blades. For example, a snow plow will often include a front blade supported ahead of the vehicle, a side-mounted wing blade supported alongside the vehicle, and/or an underbody blade mounted under the vehicle between the front and rear wheels. For purposes of illustration, FIGS. 1–3 depict installation of a cutting edge 136 and a wear plate 138 to a front blade 140, while FIG. 5 illustrates installation of the cutting edge 136 to an underbody blade 142.

Turning first to FIGS. 1–3, the cutting edge 136 is preferably placed in an upright orientation on the wall 128 between the projection 130 and the upright wall 126. The cutting edge 136 may be placed on the support wall 128 when the linkage 20 is folded so that the holder 16 is in its lowermost position, thereby reducing the amount the edge 136 must be lifted by the worker. In fact, only one end of the edge 136 need be lifted onto the support 16, and then the edge 136 may be slid lengthwise toward the propped-up end until the center of gravity of the edge 136 is securely positioned over the holder 16. The actuator 22 is then operated by cranking the arm 102 so that the rod 86 extends to raise the holder 16. Once the edge 136 is in general vertical alignment with the lower boundary of the blade 140, the cart 10 is preferably moved into proximity with the blade 140 until the edge 136 contacts the front face of the blade 140. Such movement of the cart 10 is, of course, facilitated by the tongue 14. The plate holder 16 is further raised and lowered and the cart 10 may be further moved so that the attachment holes 144 defined in the edge 136 are brought into alignment with the corresponding attachment holes 146 defined in the blade 140. Bolts 148 are preferably then inserted through the aligned attachment holes 144 and 146. If desired, the bolts 148 may be inserted before or as the holes 144 and 146 are aligned to facilitate such alignment. In addition, pins (not shown) may be inserted into one or more of the holes 144 or 146 defined in the edge 136 or blade 140 to facilitate such alignment. As perhaps best shown in FIG. 3, the holder 16 is preferably arranged so that the orientation of the plate supported on the holder 16 (the wear plate 138 in the case of FIG. 3) generally corresponds to that of the front blade 140, which further facilitates alignment of the attachment holes 144 and 146. It is also noted that the upright wall 126 is dimensioned so that it does not get caught between the edge 135 and blade 140 during installation.

The cutting edge 136 is divided into sections that are relatively shorter than the blade 140, such that each section must be individually installed. The cutting edge 136 and wear plate 138 are traditionally the same length (considering the aggregate length of the cutting edge sections), however, the wear plate 138 is traditionally not sectioned but rather comprises a single piece extending the entire length of the plow 140. Nonetheless, the wear plate 138 is installed in generally the same manner as the cutting edge 136. Thus, it shall be sufficient to explain that the wear plate 138 is positioned on the support 16 so that the center of gravity of the plate 138 is disposed over the wall 128. The height of the holder 16 is adjusted and the cart 10 is moved as necessary to align the attachment holes in the wear plate 138 with the corresponding attachment holes 146 defined in the blade 140. It will be appreciated that the bolts 148 projecting forwardly from the cutting edge 136 will facilitate such alignment. As shown in FIG. 3, the upright wall 126 will be disposed between the cutting edge 136 and wear plate 138 once the attachment holes are aligned. This will consequently require the holder 16 to be lowered or the cart 10 to be moved laterally beyond one of the ends of the blade 140 so as to remove the wall 126 from the space between the plates 136 and 138 and thereby permit the wear plate 138 to be placed against the cutting edge 136. If the cart 10 is to be moved laterally, the tongue 14 may be installed on the side attachment bracket 58 to facilitate such movement.

The plate holder 18 operates in generally the same manner as the plate holder 16. However, the plate holder 18 is designed to support the cutting edge 136 and wear plate 138 at a slightly smaller angle relative to horizontal, as perhaps best shown in FIG. 4. In particular, the cutting edge 136 is supported by the holder 18 at an angle that more closely corresponds to the angle of the underbody blade 142. Those ordinarily skilled in the art will appreciate that there is traditionally little clearance (e.g., five to seven inches) below the underbody blade 142. The plate holder 18 is particularly effective during replacement of plates on the underbody blade 142 because of its relatively lower location on the cart 10. It will also be appreciated that plate holder 18 is typically disposed at or near its lowermost position during installation of the plates on the underbody blade 142, and consequently, there will be little, if any, adjustment of the height of the plate holder 18 as the attachment holes are aligned. As shown in FIG. 4, the upright wall 132 of the plate holder 18 is disposed behind the cutting edge 136. Because the plate holder 18 is at or near its lowermost position, the cart 10 will need to be moved laterally beyond one of the ends of the blade 142.

Figure 6:
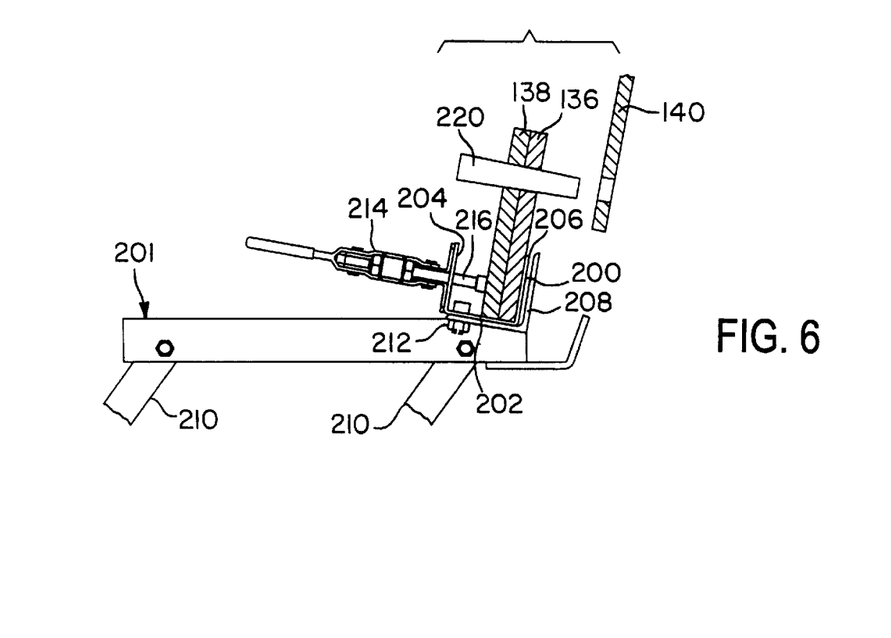
FIG. 6 is a enlarged vertical cross-sectional view of the alternative embodiment, particularly illustrating a pair of replaceable plates supported on the extension boom as they are being installed on the blade of a plow or grader.

An alternative embodiment of the present invention is shown in FIGS. 5 and 6, wherein an extension boom 200 is provided on the cart 201. The extension boom 200 is designed to hold both the cutting edge 136 and the wear plate 138. Moreover, as perhaps best shown in FIG. 5, the extension boom 200 is of sufficient length to simultaneously support all of the cutting edge sections. In this respect, installation of the entire cutting edge 136 and the wear plate 138 may be accomplished at one time.

The extension boom 200 preferably comprises a U-shaped channel presenting a bottom support wall 202 and a pair of spaced apart upright walls 204 and 206. The cart 201 is generally similar to that shown in FIGS. 1–4, with the extension boom 200 preferably being attached to the plate holder 208 so as to be carried on the cart frame (not shown) by the parallelogram linkage 210. It is particularly noted that such attachment is accomplished by a plurality of nut and bolt assemblies 212 that cooperatively present a projection on the support wall 202 spaced from the upright wall 206. A pair of clamping mechanisms 214 (only one of the clamping mechanisms being shown in the drawing figures) are attached to the upright wall 204. As shown in FIG. 5, each of the mechanisms includes a shiftable clamping element 216 projecting through an open slot 218 defined in the wall 204, for purposes which will subsequently be described. One suitable clamping mechanism is available as Part No. 210 from Dover Resources Co. of Troy, Mich. However, it is entirely within the ambit of the present invention to utilize various other clamping mechanisms (e.g., a traditional C-clamp would suffice).

The extension boom 200 is used in virtually the same manner as the plate holders 16 and 18, although the boom 200 does have a few beneficial exceptions. The sections of the cutting edge 136 are preferably first placed end-to-end on the support wall 202, with the nut and bolt assemblies 212 serving to maintain the edge 136 in an upright orientation against the wall 206. It is noted that the illustrated boom 200 is not quite as long as the edge 136, however, the boom 200 is of sufficient length to ensure that the center of gravity for each of the outermost sections may be securely disposed over the support wall 202. The unitary wear plate 138 is then placed on the support wall 202 between the cutting edge 136 and the nut and bolt assemblies 212. The attachment holes defined in the plates 136 and 138 are subsequently aligned, which should occur naturally when the plates are superimposed. If desired, pins 220 may be inserted into the aligned attachment holes, with at least one pin preferably being associated with each section of the cutting edge 136. The clamping mechanisms 214 are then operated to clamp the plates 136 and 138 to one another and against the upright wall 206. The alignment pins 220 may be removed at this time, although they are preferably left in the attachment holes to facilitate attachment to the blade 140. The height of the boom 200 may then be adjusted and the cart 201 may be moved until the pins 220 are received in the corresponding attachment holes defined in the blade 140. Bolts (not shown) can subsequently be inserted into the open attachment holes (the holes not having a pin received therein), and the pins 220 may then be removed so that the remaining bolts can be installed. Thereafter, the plates 136 and 138 are unclamped and the cart 201 can be moved away from the blade 140.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A device for handling replaceable, elongated plates used on the blade of a plow or grader, said device comprising:

a wheeled frame for movement across the ground;

an elongated plate holder configured to support at least one plate lengthwise in an upright orientation, said plate holder including a generally horizontal, longitudinally extending support surface configured to support the at least one plate thereon and a generally upright, longitudinally extending wall against which the at least one plate may lean when supported on the support surface in the upright orientation, said wall projecting from the support surface such that the plate holder presents an angled cross-sectional shape, said plate holder further including a stop on the support surface at a location spaced from the wall, with the stop serving to retain the at least one plate in the upright orientation; and a parallelogram linkage supporting the plate holder on the frame for up and down movement relative to the ground, such that the support surface and the wall are maintained generally horizontal and upright, respectively, as the holder is moved up and down.

2. A device as claimed in claim 1; and an actuator coupled between the frame and linkage for controlling up and down movement of the plate holder.

3. A device as claimed in claim 2, said actuator comprising a hydraulic piston and cylinder assembly.

4. A device as claimed in claim 2; and an arm pivotally connected to the linkage, said actuator presenting opposite ends and being attached to the arm adjacent one end and pivotally coupled to the frame adjacent the opposite end.

5. A device as claimed in claim 1, said frame including at least two spaced apart tongue attachment brackets; and a tongue alternatively attachable to the brackets.

6. A device as claimed in claim 5, said frame including a plurality of caster wheel assemblies that permit multidirectional movement of the device across the ground, said tongue projecting in a first direction when attached to one of the brackets and in a second direction when attached to another one of the brackets, said first and second directions being substantially transverse to one another.

7. A device as claimed in claim 5, said tongue being swingable about a substantially horizontal axis.

8. A device as claimed in claim 5, said tongue including a handle.

9. A device as claimed in claim 1, said stop including a projection extending from the support surface.

10. A device as claimed in claim 1, said plate holder including at least one clamping mechanism operable to clamp the at least one plate against the wall.

11. A device as claimed in claim 1, said plate holder being sectioned, with the longitudinally extending support surface and upright wall being defined by a plurality of spaced apart holder sections.

12. A device as claimed in claim 1, said frame being moveable in a forward direction of travel, said plate holder being located adjacent a forward margin of the parallelogram linkage.

13. A cart for handling replaceable plates used on the blade of a plow or grader, said cart comprising:

a wheeled frame;

a tongue projecting from the frame;

an elongated plate holder configured to support at least one plate thereon, said plate holder including a generally horizontal, longitudinally extending support surface configured to support the at least one plate thereon and a generally upright, longitudinally extending wall against which the at least one plate may lean when supported on the support surface in the upright orientation, said wall projecting from the support surface such that the plate holder presents and angled cross-sectional shape, said plate holder further including a stop on the support surface at a location spaced from the wall, with the stop serving to retain the at least one plate in the upright orientation;

a parallelogram linkage supporting the plate holder on the frame for up and down movement relative to the ground, such that the support surface and the wall are maintained generally horizontal and upright, respectively, as the holder is moved up and down; and an actuator coupled between the frame and linkage, with the actuator being operable to move the linkage relative to the frame and thereby adjust the height of the plate holder.

14. A cart as claimed in claim 13, said actuator comprising a hydraulic piston and cylinder assembly.

15. A cart as claimed in claim 13; and an arm pivotally connected to the linkage, said actuator presenting opposite ends and being attached to the arm adjacent one end and pivotally coupled to the frame adjacent the opposite end.

16. A cart as claimed in claim 13, said frame including a plurality of caster wheel assemblies that permit multidirectional movement of the cart across the ground, said frame further including at least two spaced apart tongue attachment brackets, each configured to removably attach the tongue to the frame, said tongue projecting in a first direction when attached to one of the brackets and in a second direction when attached to another one of the brackets, said first and second directions being substantially transverse to one another.

17. A cart as claimed in claim 13, said stop including a projection extending from the support surface.

18. A cart as claimed in claim 13, said plate holder including at least one clamping mechanism operable to clamp the at least one plate against the wall.

19. A cart as claimed in claim 13, said plate holder being sectioned, with the longitudinally extending support surface and upright wall being defined by a plurality of spaced apart holder sections.

20. A cart as claimed in claim 13, said frame being moveable in a forward direction of travel, said plate holder being located adjacent a forward margin of the parallelogram linkage.

\* \* \* \* \*